(12) United States Patent
Sauter et al.

(10) Patent No.: US 7,359,114 B2
(45) Date of Patent: Apr. 15, 2008

(54) CLIP-ON NIGHT VISION DEVICE

(75) Inventors: Kenneth W. Sauter, Garland, TX (US); Rodney L. Doster, Garland, TX (US); Roland M. Morley, Richardson, TX (US)

(73) Assignee: Litton Systems, Inc., Los Angeles, CA (US)

( * ) Notice: Subject to any disclaimer, the term of this patent is extended or adjusted under 35 U.S.C. 154(b) by 0 days.

(21) Appl. No.: 11/423,897

(22) Filed: Jun. 13, 2006

(65) Prior Publication Data

US 2008/0043322 A1    Feb. 21, 2008

(51) Int. Cl.
*G02B 23/12* (2006.01)

(52) U.S. Cl. .................. 359/353; 359/350; 359/351; 359/426

(58) Field of Classification Search ............ 359/426, 359/350, 351, 353
See application file for complete search history.

(56) References Cited

U.S. PATENT DOCUMENTS

| | | |
|---|---|---|
| 4,313,272 A | 2/1982 | Matthews |
| 4,649,274 A | 3/1987 | Hartmann |
| 5,745,287 A | 4/1998 | Sauter |
| 5,793,528 A | 8/1998 | Wallace et al. |
| 5,877,902 A | 3/1999 | Sauter |
| 5,884,884 A | 3/1999 | Sauter |
| 5,892,617 A | 4/1999 | Wallace |
| 5,898,519 A * | 4/1999 | Palmer ............ 359/399 |
| 5,902,996 A | 5/1999 | Sauter |
| 5,907,150 A | 5/1999 | Saldana |
| 5,973,315 A | 10/1999 | Saldana et al. |
| 6,000,667 A | 12/1999 | Isbell et al. |
| 6,061,945 A | 5/2000 | Wallace et al. |
| 6,073,895 A | 6/2000 | Isbell et al. |
| 6,094,304 A | 7/2000 | Wallace et al. |
| 6,111,692 A * | 8/2000 | Sauter ............ 359/429 |
| 6,154,313 A | 11/2000 | Isbell et al. |
| 6,169,628 B1 | 1/2001 | Isbell et al. |
| 6,172,821 B1 | 1/2001 | Isbell et al. |
| 6,204,961 B1 | 3/2001 | Anderson et al. |
| 6,295,170 B1 * | 9/2001 | Wallace et al. .... 359/813 |
| 6,359,681 B1 | 3/2002 | Housand et al. |

* cited by examiner

Primary Examiner—Joshua L Pritchett
(74) Attorney, Agent, or Firm—Marsteller & Associates, P.C.

(57) ABSTRACT

A night viewer (10) is adaptable to generate an enhanced image suitable for viewing through an optical scope (16). An input end (18) of the viewer (10) receives the image to be enhanced through an objective lens (20). An image enhancing unit (22) enhances the image. The enhanced image is optically transmitted from a display (28) to the ocular lens (24) of the scope (16). The display (28) is operably connected with the image enhancing unit (22) to display the enhanced image. A Risley prism (30) located in an image path (32) is used to controllably adjust and to maintain boresight alignment (36).

14 Claims, 9 Drawing Sheets

CLIP-ON NIGHT VISION DEVICE

BACKGROUND OF THE INVENTION

1. Technical Field

The invention relates to the field of night viewer type devices for enhancing the image of a scene to be viewed, and more particularly to weapon mounted night viewer devices suitable for combined use with known man-portable weapon sights.

2. Background Art

Single unit day/night sights have been used by military and law enforcement personnel to aim weapons used in both day time and night time conditions. Typically, a day/night sight includes an objective lens, a reticle and an eyepiece in series with parallel, but separate, day and night channels. A channel selector or optical switch may be used to alteratively direct an image of a target into the day or night channel.

In a day/night sight, the objective lens and the eyepiece may be telescopic to provide a magnified image of the target. The day channel generally uses ambient light to generate an image of the target. The image may be projected or electronically conveyed to a display or to a ocular lens assembly to be viewed by the user. The night channel generally includes an image intensifier to generate an illuminated image of the target. The illuminated image may be likewise projected or electronically conveyed to a display during night time use to be viewed by the user.

Risley prisms have been used in the daylight optical path of the prior dual path devices. U.S. Pat. No. 6,169,628 and U.S. Pat. No. 6,172,821 teach such a day/night scope with Risley prism located in the day branch of the parallel optical path. U.S. Pat. No. 6,111,692 similarly teaches the use in another day/night scope of a Risley prism located in the optical path between the objective lens and a movable focus cell group.

A problem with day/night and other types of combined sights is the bulk and the added weight of two sighing systems that must be carried when the unit is being used in the field.

Also, U.S. Pat. No. 6,111,692 and others disclose in general moving a focus cell lens group in the X-Y-Z dimensions or directions relative to a night path or channel of a day/night scope. Such movement of the focus cell in devices similar to that disclosed in U.S. Pat. No. 6,111,692 was accomplished through the use of an eccentric cam and pin arrangement limiting fore and aft movement of the focus cell to correspond to the rotation of the cam.

While the above cited references introduce and disclose a number of noteworthy advances and technological improvements within the art, none completely fulfills the specific objectives achieved by this invention.

DISCLOSURE OF INVENTION

In accordance with the present invention, a night viewer device is adaptable to generate an enhanced image of a scene suitable to be viewed through an optical scope. An input end of the night viewer device receives the image to be enhanced from an ocular lens end of the optical scope. An image enhancing unit enhances the image into a desired format. The image to be enhanced is optically transmitted from the ocular lens end of the optical scope and is received by an input end of the image enhancing unit. An output image display unit operably connected with the image enhancing unit displays the enhanced image. A Risley prism unit that is located in an image path through the night viewer device after a collimating lens assembly of the night viewer device is used to controllably adjust and to maintain boresight alignment of the optical scope and image enhancing unit of the night viewer device.

A primary objective of the present invention is to provide a simple and reliable method of setting boresight alignment with a mechanism that would hold boresight alignment through extended weapon shock. Also, since the optical sight on the man portable weapon is normally "boresighted" for accuracy before use, a removable night viewer device that cooperates with the mounted scope greatly reduces the need to remove the optical scope or otherwise changing the boresight alignment of the scope.

To achieve the necessary precision in alignment and the necessary robustness of the assembly, these two functions are separated in the present invention. After the main optical components, those being the objective lens, image intensifier and collimator lens, have been secured, the setting and adjustment of boresight is achieved by rotating a pair of Risley prisms. This novel concept has proven to be a precise, reliable and simple method which enables the user to make the necessary assembly and alignment steps during system maintenance.

In another embodiment of the present invention, a focusable night viewer device adapted to receive an image to be enhanced of a scene to be viewed includes an objective lens assembly for gathering light forming the image of the scene to be viewed. An image enhancing unit enhances the image into a desired format. The image to be enhanced is received at an input end of the image enhancing unit. An output image display unit is operably connected with the image enhancing unit for viewing of the enhanced image by a user. A focusing assembly for controllable moving by a user a focus cell assembly mounted between the objective lens assembly and the image enhancing unit fore and aft along a desired optical axis through the objective lens assembly. Rotational movement of a user accessible knob assembly about an axis essentially perpendicular to the optical axis is mechanically translated into rotational movement of the focus cell to move the focus cell fore and aft relative to the objective lens assembly along the desired optical path through the objective lens assembly.

The focusing assembly for the focus cell lens group is readily adjustable both in the field and by the user while at the same time provides for a greater range of fore and aft movement of the focus cell than prior art cam and pin focusing devices.

These and other objects, advantages and preferred features of this invention will be apparent from the following description taken with reference to the accompanying drawings, wherein is shown the preferred embodiments of the invention.

BRIEF DESCRIPTION OF DRAWINGS

A more particular description of the invention briefly summarized above is available from the exemplary embodiments illustrated in the drawing and discussed in further detail below. Through this reference, it can be seen how the above cited features, as well as others that will become apparent, are obtained and can be understood in detail. The drawings nevertheless illustrate only typical, preferred embodiments of the invention and are not to be considered limiting of its scope as the invention may admit to other equally effective embodiments.

MODE(S) FOR CARRYING OUT THE INVENTION

So that the manner in which the above recited features, advantages and objects of the present invention are attained can be understood in detail, more particular description of the invention, briefly summarized above, may be had by reference to the embodiment thereof that is illustrated in the appended drawings. In all the drawings, identical numbers represent the same elements.

Figure 1:
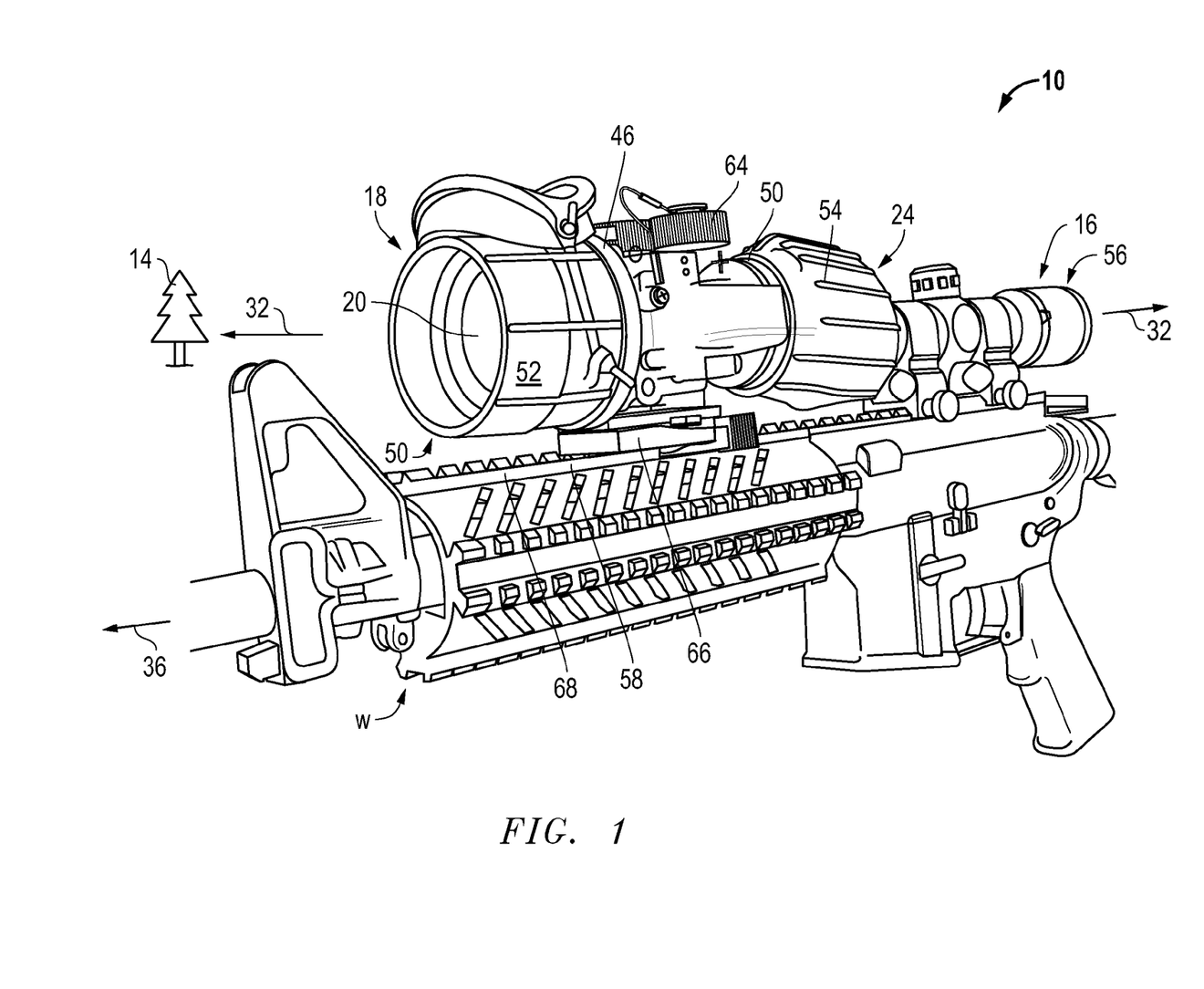
FIG. 1 is a left side elevational view of the night viewer device mounted on a man-portable weapon in front of a known optical scope.
Figure 2:
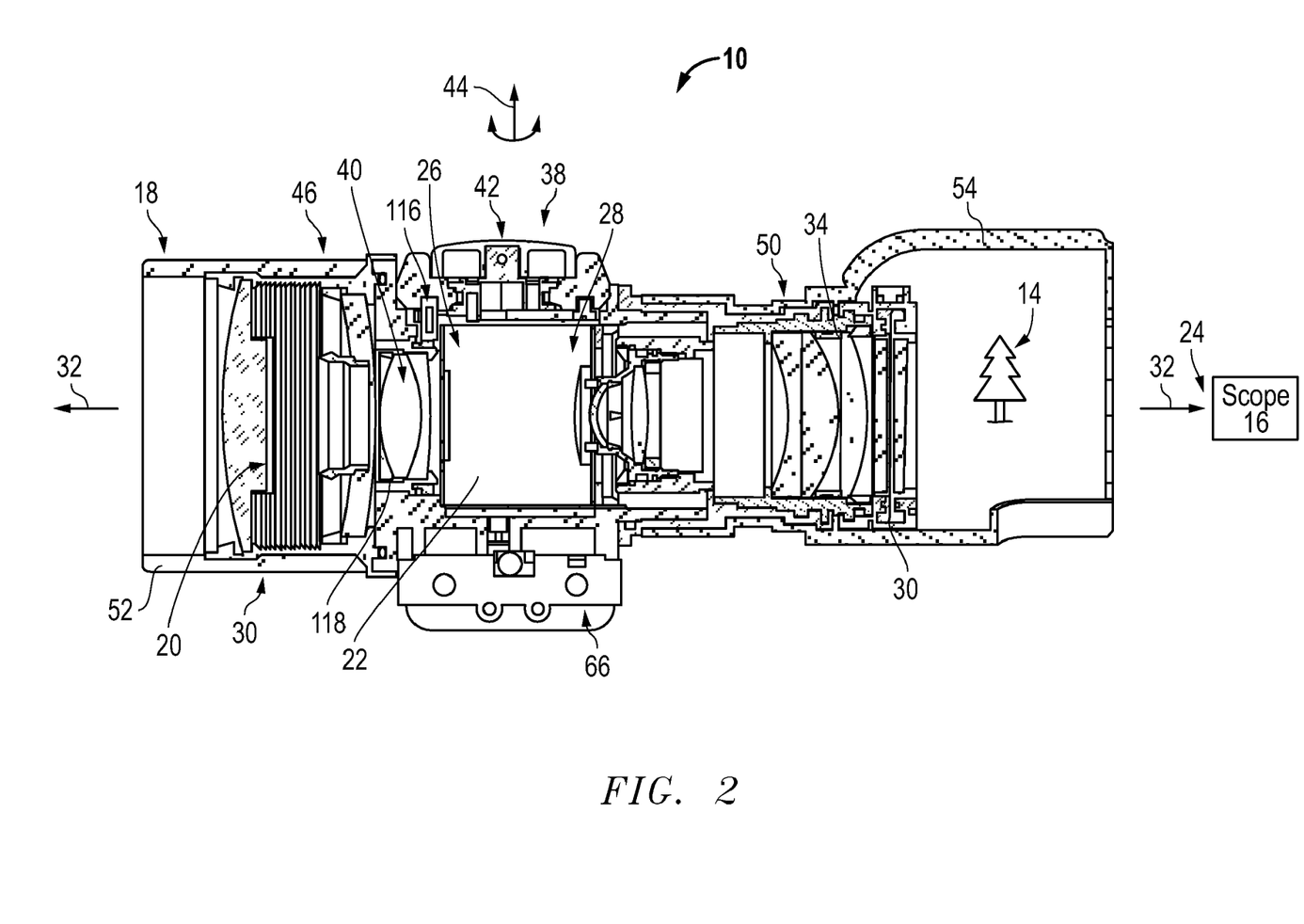
FIG. 2 is a cross-sectional view of the night viewer device of the present invention taken along a central optical axis.
Figure 4:
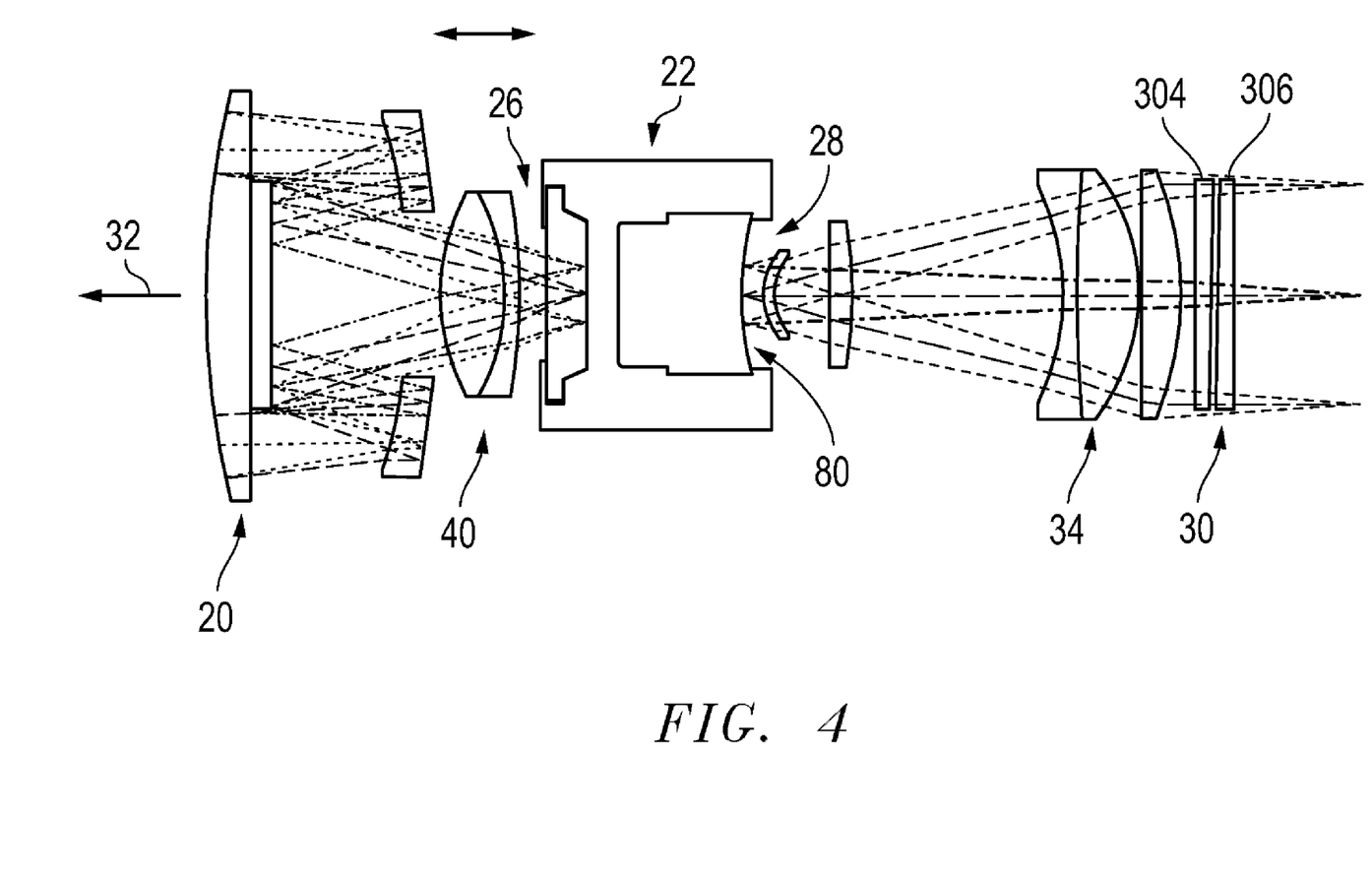
FIG. 4 is a schematic view of the optical path through the night viewer of the present invention.
Figure 5:
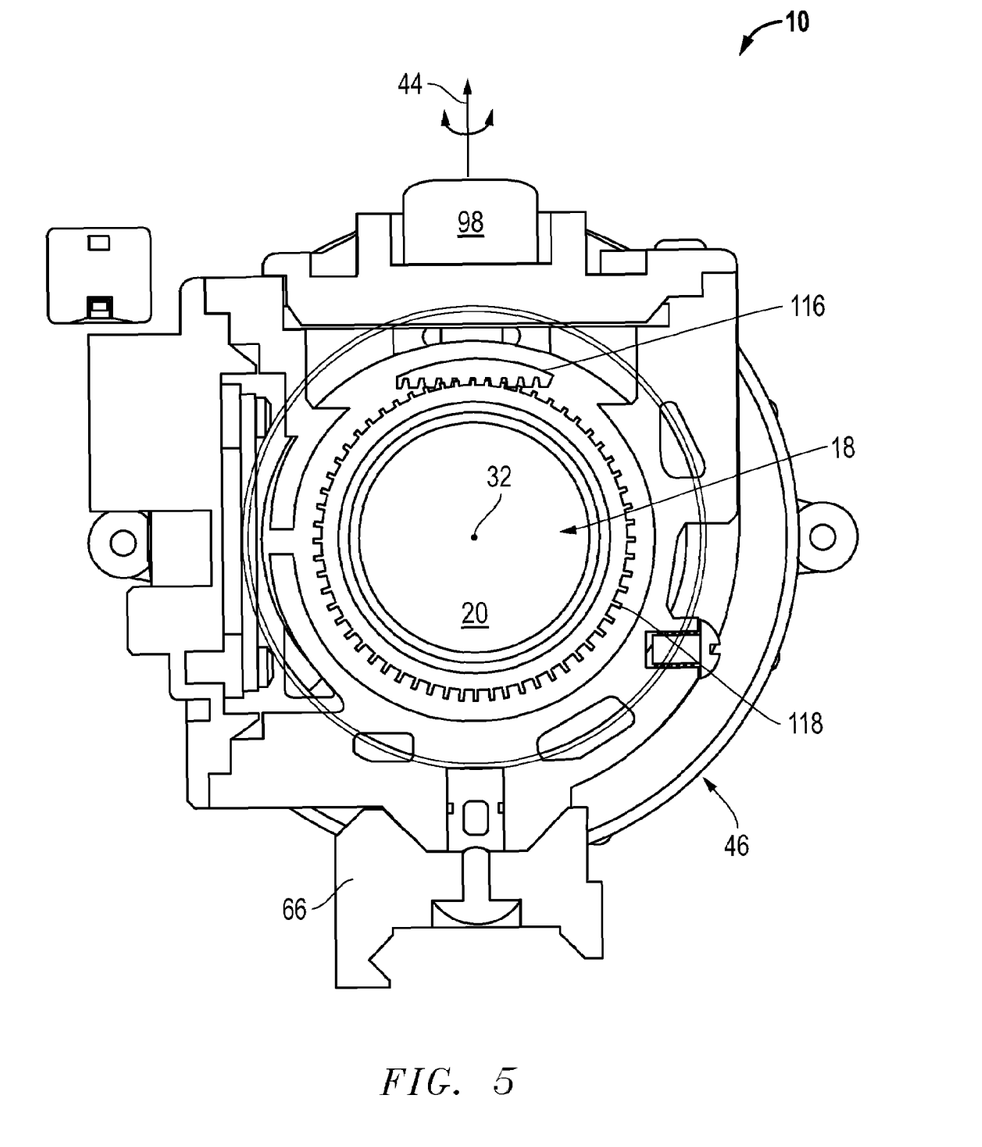
FIG. 5 is a frontal view of the night viewer of the present invention.

A mountable clip-on night viewer device ("CNVD") 10 is adaptable to generate an enhanced image 12 of a scene 14 suitable to be viewed through a Rifle Combat Optic (RCO) or optical scope 16. An input end 18 of the night viewer device 10 receives the input image to be enhanced through an objective lens assembly 20. An image enhancing unit 22 enhances the input image of the scene into a desired format. The image to be enhanced is optically transmitted to an ocular lens end 24 of the optical scope 16 after being received through an input end 26 of the image enhancing unit 22. An output image display unit 28 operably connected with the image enhancing unit 22 displays the enhanced image 12. A Risley prism unit 30 is located in an optical image path 32 through the night viewer device 10 after a collimating lens assembly 34 of the night viewer device 10. The Risley prism unit 30 is used to controllably adjust and to maintain boresight alignment 36 of the optical scope 16 and image enhancing unit 22 of the night viewer device 10 for accuracy of weapon projectile delivery.

Figure 7:
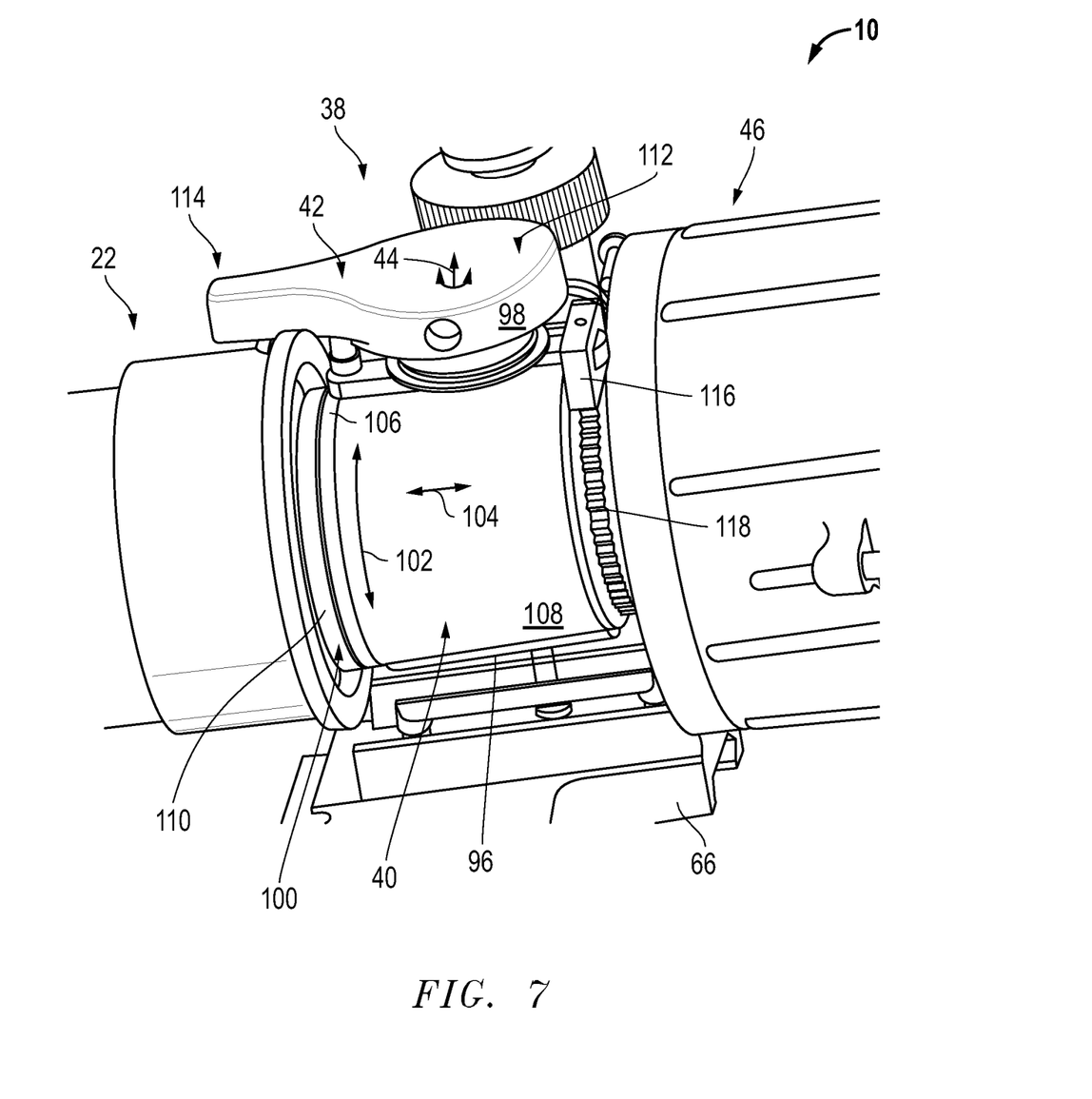
FIG. 7 is a left rear perspective view of the present invention exposing a view of a focus cell lens grouping for the night viewer device.
Figure 8:
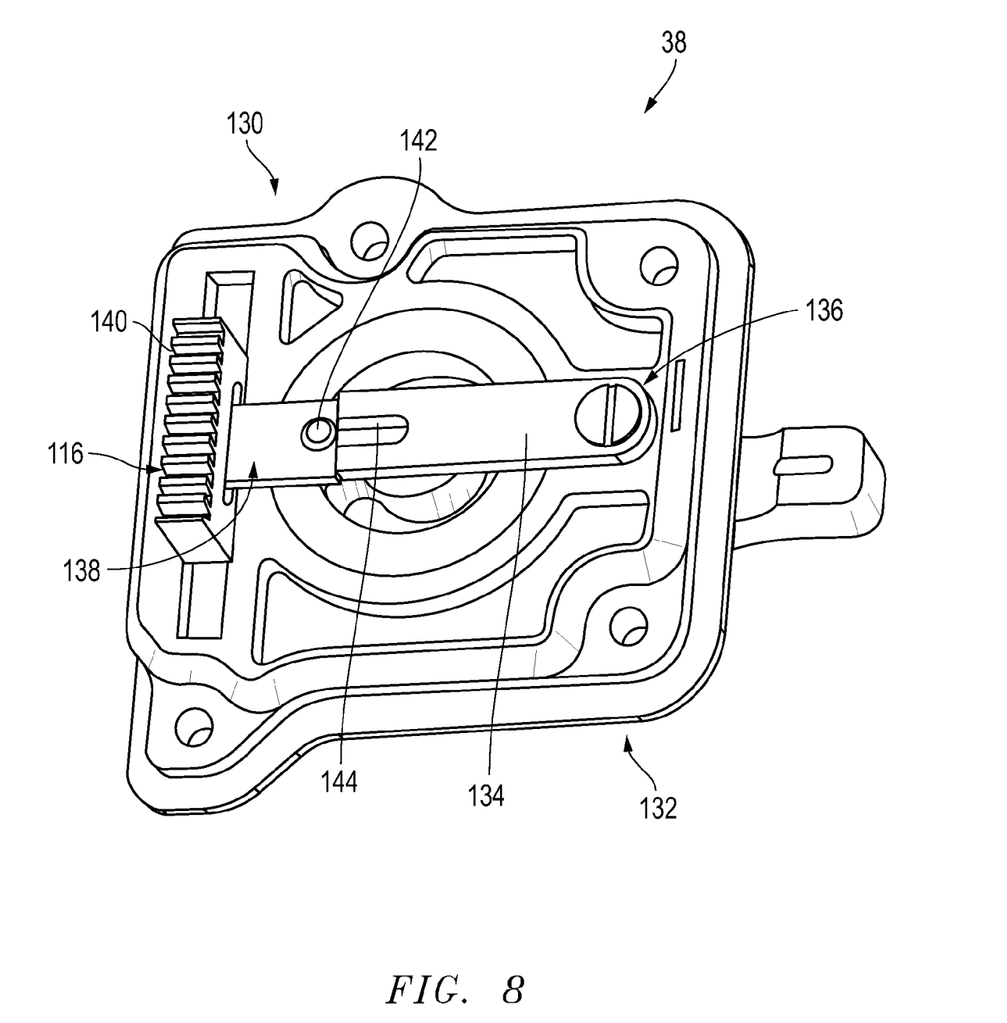
FIG. 8 is a bottom isometric view of a rack assembly unit for focusing the focus cell lens group.

Additionally, in another embodiment of the present invention, a focusable nightt viewer device 10 adapted to receive an image to be enhanced of a scene 14 to be viewed includes an objective lens assembly 20 for gathering light forming the image of the scene 14 to be viewed. An image enhancing unit 22 enhances the image into a desired format. The image to be enhanced is received at an input end 18 of the image enhancing unit 22. An output image display unit 28 is operably connected with the image enhancing unit 22 for viewing of the enhanced image 12 by a user. A focusing assembly 38 permits controllably moving by a user a focus lens cell assembly 40 that is mounted between the objective lens assemlby 20 and the image enhancing unit 22 in a fore and aft direction along a desired central optical axis or image path 32 through the objective lens assembly 20. Rotational movement of a user accessible knob assembly 42 about an axis 44 essentially perpendicular to the optical axis 32 is mechanically translated into rotational movement of the focus cell 40 to move the focus cell 40 fore and aft relative to the objective lens assembly 20 along the desired optical path 32 through the objective lens assembly 20.

Mountable Night Viewer Having Risley Prisms for Boresight Alignment

The mountable clip-on night viewer device ("CNVD") 10 is adaptable to generate an enhanced image 12 of a scene 14 suitable to be viewed through a known Rifle Combat Optic (RCO) or optical scope 16 that may be found in use by various militaries. The optical scope 16 thus views the enhanced image 12, rather than the actual scene 14.

An input end 18 of the night viewer device 10 receives the input image to be enhanced through an objective lens assembly 20. An image enhancing unit 22 enhances the input image of the scene into a desired format. The image to be enhanced is optically transmitted to an ocular lens end 24 of the optical scope 16 after being received through an input end 26 of the image enhancing unit 22. An output image display unit 28 operably connected with the image enhancing unit 22 displays the enhanced image 12.

Figure 9:
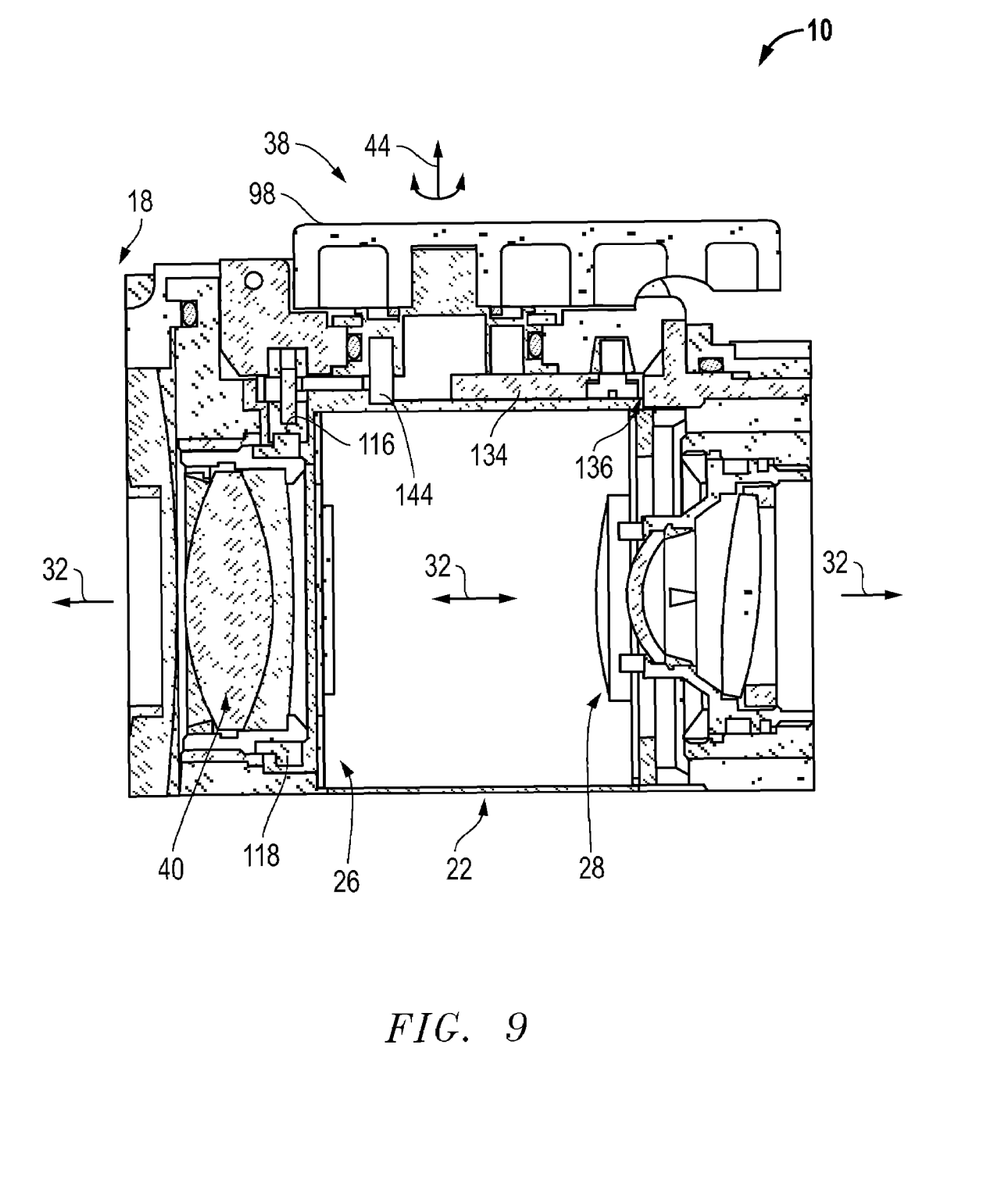
FIG. 9 is a cross sectional view showing the optical components of the present night viewer.

A Risley prism unit 30 is located in an optical image path 32 through the night viewer device 10 after a collimating lens assembly 34 of the night viewer device 10. The Risley prism unit 30 is used to controllably adjust and to maintain boresight alignment 36 of the optical scope 16 and image enhancing unit 22 of the night viewer device 10. Generally, the Risley prism unit 30 comprises two or more complementary Risley prisms 30a and 30b. Rotation of one prism with regard to another prism adjusts the optical path 32 as desired to maintain the boresight alignment 32.

Figure 3:
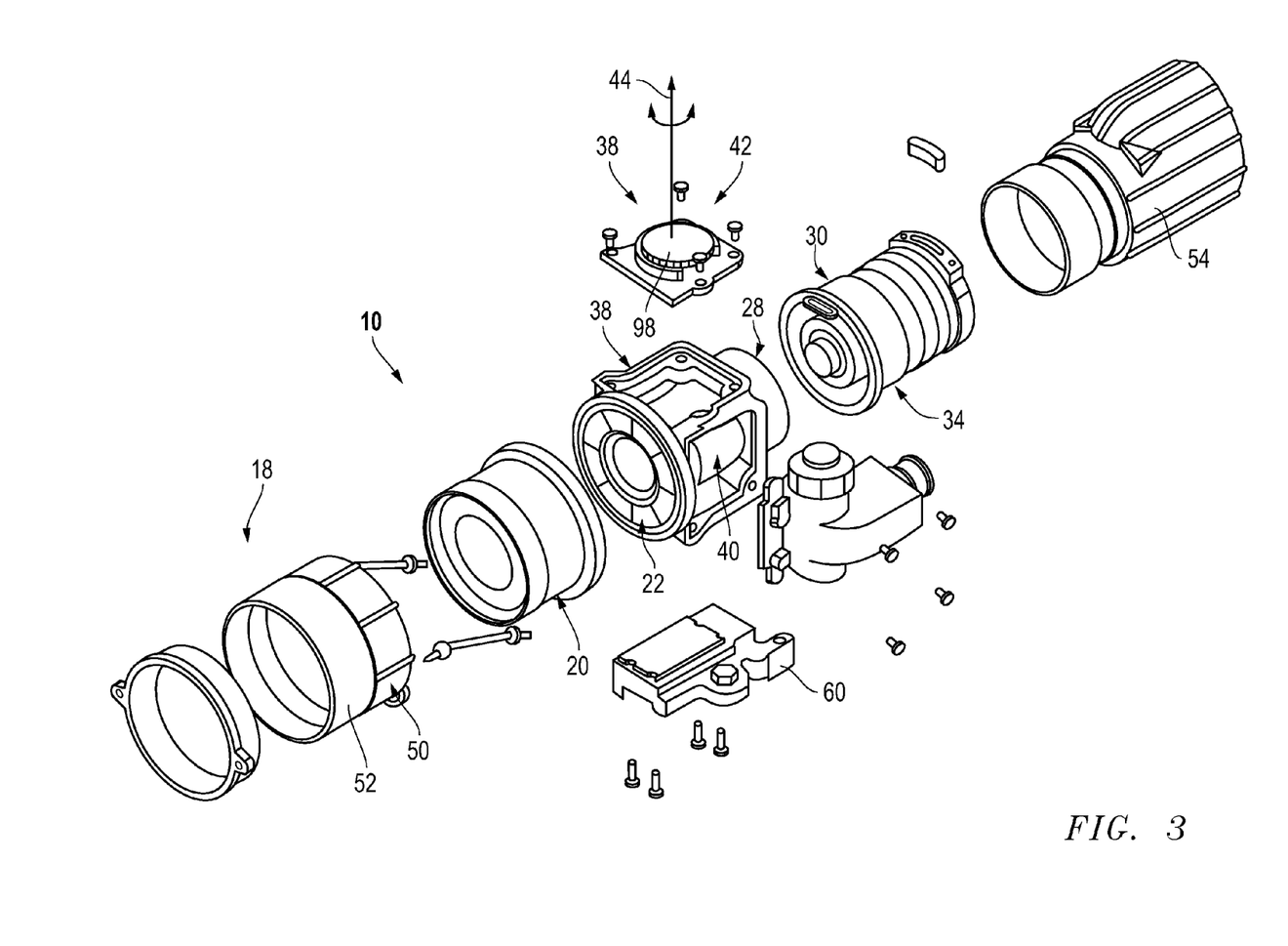
FIG. 3 is a left frontal exploded isometric view of the night viewer device of the present invention.

The CNVD 10 of the present invention may be constructed of light weight materials. The main housing 46 may be injection molded glass fiber reinforced ULTEM, a material that has been used in many prior night vision products. Lens barrels 50 may be formed from aluminum, with a scratch resistant anodized coating applied. All materials preferably should have been proven to be very durable against physical and chemical exposure to all normal military operating environments, including salt fog, and solutions such as insect repellents, cleaning solutions and petroleum based products.

The objective lens assembly 20 for the CNVD 10 may be a known 55 mm, F/1.1 Mangin design that offers high optical performance to low light level conditions and is an extremely lightweight design.

A molded rubber hood 52 may cover the objective lens 20 optionally providing mechanical protection to the lens and serving as a light baffle against stray light from sources outside the field of view.

The CNVD collimating lens 34 preferably works with a large variety of day optics by having a large exit pupil. A flexible rubber lens hood 54 at the rear ensures that light security between the CNVD 10 and RCO 16 is maintained. The light exiting the rear 56 of the RCO 16 illuminates the users eyeball only and does not spill onto the user's face.

Extremely simple to install, the present CNVD 10 may be mounted and locked onto a weapon rail mounting system 58 using a quick-action throw lever mount 66. After a lever 60 is closed, the device is locked by sliding forward to engage a catch. This installation is tools free and can typically be achieved in less than 10 seconds. Once installed, the CNVD 10 is considered simple to operate, by turning a power switch ON the sight is energized and the normal sighting features of the RCO (field of view and reticle pattern) are unchanged. Sight picture is optimized by adjusting an OFF/

ON manual gain control knob as the system is turned ON, or at any time during operation. The sight picture is focused by adjusting the range focus level or knob at the top front portion of the sight. Designed for maximum flexibility, the range focus lever may be reached equally well from either side of the CNVD. All user controls and adjustments should preferably be tactile, provide user feedback during operation, and be accessible even with arctic gloves.

The CNVD 10 may incorporate a compact optical design, lightweight molded ULTEM plastic housing 46 and a low profile mount design, resulting in an exceptionally small system.

The CNVD 10 also presents a low profile when mounted on the weapon W, with a minimum of snag hazard which would cause the sight to tangle in vines, branches, barbed wire, etc. during a mission.

A CNVD battery cap 64 is preferably readily accessible with a gloved hand, and a typical battery can be quickly replaced while the CNVD 10 is still weapon mounted. A polarity indicator, in the form of an embossed "plus" symbol may be formed on the exterior of the housing 46 indicating a correct battery orientation. Reverse polarity protection may ensure that no damage is caused by incorrect insertion of the battery. An optional low battery indicator may further alert the operator when less than 30 minutes of battery life, for instance, remains.

The clip-on night viewer device 10 of the present invention is mountable on a man portable weapon W with a known rail-type of weapons mount 58 of the type that includes a rail unit 68 mounted on the man-portable weapon W and a chip on mount unit 66 that is attachable to the night viewer device 10 to releasably engage with the complementary rail 68.

The man portable weapon W has a mounted (fixed or removable) optical scope 16 aligned with the mounting rail 68 and further alignable with the bore of the weapon W (the boresight alignment 36 for the weapon being used). The night viewer device 10 is mountable in an optical path 32 ahead of the optical scope 16 in order that the optical scope "looks" into the display 28 of the CNVD 10 rather than directly downrange to the scene 14 to be viewed. Typically, the CNVD 10 will be releasably mountable in proximity to the optical sight 16 for light transmission optimization and to reduce extraneous light from escaping the CNVD 10 alerting an enemy to the position of the night viewer and user.

Figure 6:
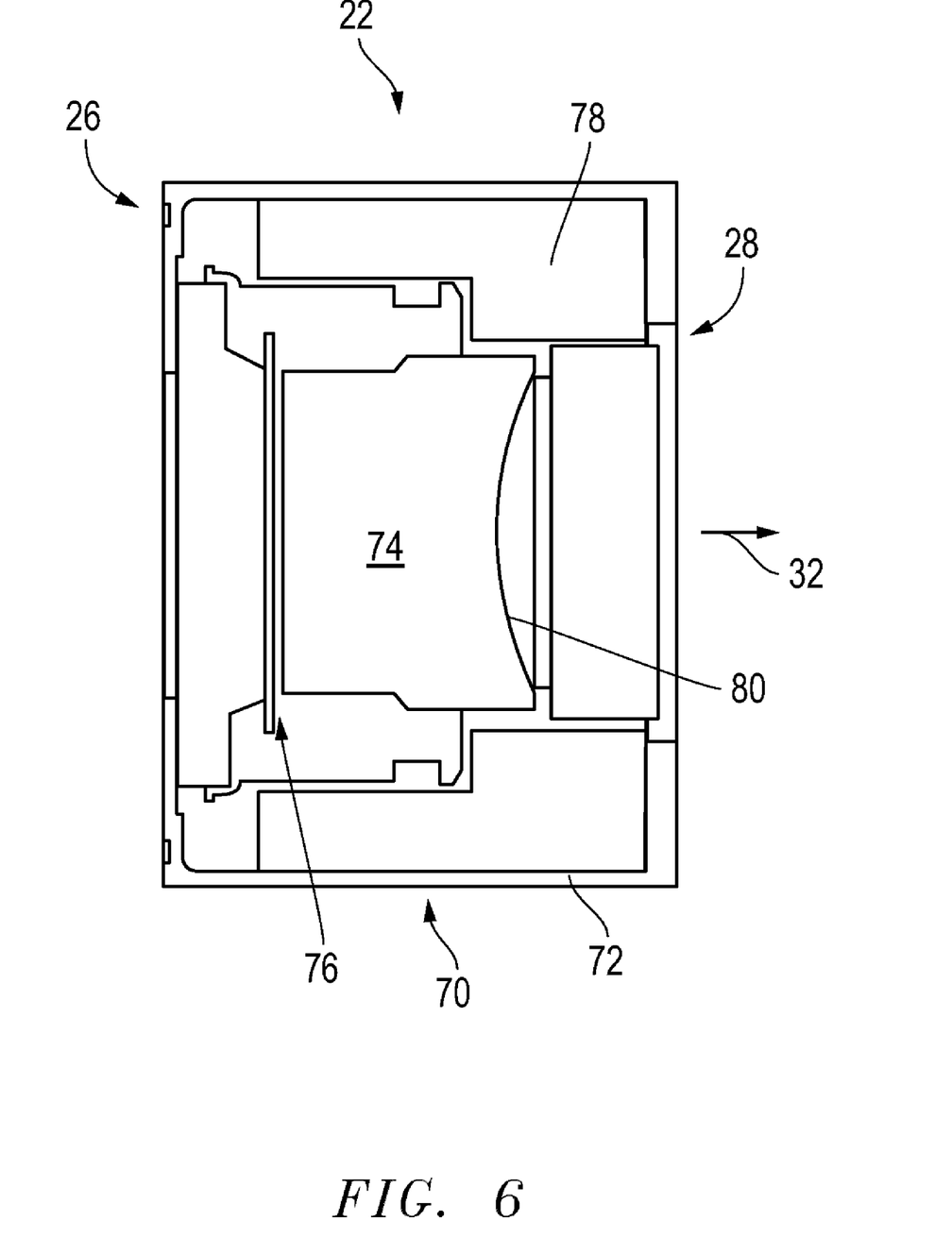
FIG. 6 is a cross sectional view of an image intensifier suitable for use in the present invention.

The image enhancing unit 22 of the CNVD 10 generally includes a known type of image intensifier tube 70 having a housing 72, a typical fiber optic bundle 74, photocathode 76, power supply 78, and output imager 80. The image intensifier 70 is preferably maintained in a fixed position within the main housing 46 whereas the focus cell 40 is movable for focusing of the image.

Typically, the output image display 28 of the CNVD is a phosphorescent screen developing an image is a common green hue. Alternatively, the output of the image intensifier tube 70 can be operationally connected using any known technique to an electronic display, either for direct viewing or remote viewing as appropriate and desired while maintaining boresight alignment of the scope and the weapon. The rear display hood or shield 54 may be used to reduce the extraneous release of light from the CNVD display.

The CNVD 10 of the present invention is a rugged electro-optical system providing night-time engagement capability to the user eliminating the requirement to remove the Rifle Combat Optic (RCO), or optical scope 16. The CNVD 10 attached to the MIL-STD-1913 rail 68 in front of and in line with the RCO 16, without any change to the RCO position. It extends the use of the RCO 16 aiming capability into low light level conditions such as twilight or night. The CNVD 10 optionally includes the known quick disconnect (QD) single-throw locking lever type mount 66 to enable a rapid transition from day-time to night-time engagement modes. The present CNVD 10 may also be used independently as a hand-held night vision viewer.

The CNVD unity power design preserves the normal RCO sight picture for the user in terms of field of view and reticle appearance. The RCO 16 zero is maintained when the CNVD 10 is installed.

The CNVD 10 may utilize a known MX-11769-type 18 mm high performance Gen III tube 70 with an autogated power supply 78. This is the same tube type that has been provided in the AN/PVS-14 night vision goggle and has been used on the AN/PVS-24 night viewer.

An optical axis 32 of an optical scope 16 and a night viewer device 10 can thus be aligned through the steps of:
 a. enhancing an image of a scene to be viewed with an image enhancing unit 22 for enhancing the image into a desired format; the image to be enhanced being received by an input end of the image enhancing unit 26;
 b. producing an output image with an output image display unit 28 for selective viewing of the enhanced image 12; and,
 c. transmitting the enhanced image 12 of the scene 14 to be viewed through a Risley prism unit 30.

With such a system of the present invention, the optical axis alignment of the night viewer device is adjusted through rotation of at least one prism in the Risley prism unit 30a and 30b.

Focus Mechanism of Focus Cell Lens Group

In another embodiment of the present invention, the focusable night viewer device 10 is adapted to receive an image to be enhanced of a viewed or observed scene 14, and, similar to described above, includes an objective lens assembly 20 for gathering light forming the image of the scene 14 to be viewed. The image enhancing unit 22 enhances the image into a desired format as previously described. The image to be enhanced is received at an input end 18 of the image enhancing unit 22. An output image display unit 28 is operably connected with the image enhancing unit 22 for viewing of the enhanced image 12 by a user.

A focusing assembly 38 is used for controllably moving by a user a focus lens cell assembly 40 that is mounted between the objective lens assembly 20 and the image enhancing unit 22 in a fore and aft direction along a desired central optical axis or image path 32 through the objective lens assembly 20. Rotational movement of a user accessible knob assembly 42 about an axis 44 essentially perpendicular to the optical axis 32 is mechanically translated into rotational movement of the focus cell 40 to move the focus cell 40 fore and aft relative to the objective lens assembly 20 along the desired optical path 32 through the objective lens assembly 20.

Generally, the central axis 32 through the objective lens 20 and a central axis of the image enhancing unit 22 are aligned and normally co-axially so aligned.

The focus cell lens assembly 40 moves along a track system or guide 96 responsive to a user's control of a rotatable knob 98. Generally, the focus knob 98 rotates left or right about the vertical axis 44.

The focus cell 40 preferably moves being guided by a helical guide system 100 producing rotational 102 and translational 104 movement of the focus cell 40 relative to the objective lens assembly 20 along the desired optical axis 32 through the objective lens assembly 20. The helical guide 100 preferably includes a threaded segment 106 formed on a portion of the exterior 108 of the focus cell 40 with a complementary threaded segment 110 mounted in the interior of the night viewer device 10.

Optionally, the knob 98 may be tadpole-like shaped having a central body 112 that is essentially circular or round and an extended level portion 114 extending from the central body 112 for enhanced user control. Such a design permits the user in the field to rapidly move the knob 98 and thereby quickly achieving improved focus.

The rotational movement of the knob 98 may be mechanically transmitted to a rack segment 116 or mechanism for moving a complementary spur gear 118 attached to an exterior portion 108 of the focus cell 40.

Referring now particularly to FIG. 8, the rack mechanism 116 and knob 98 are shown preferably mounted on the underside 130 of a removable portion 132 of the housing 46. A slotted bar 134 has a first end 136 pivotally attached of the housing segment 132 off center of the axis 44 of rotation for the knob 98. The opposite end 138 of the slotted bar 134 has a rack element or segment 140 with teeth attached to engage the complementary teeth of the spur gear 118 that is formed about the portion of the movable focus cell assembly 40 with the orientation of the spur gear 118 being essentially perpendicular to the central optical axis 32.

The rack element 140 should be movably affixed to the second end 138 of the slotted bar 134. A pin 142 is affixed to the underside of the knob 98 off center of the axis 44 of rotation for engaging the slot 144.

The user rotates the knob 98 causing the rack 140 to move at the end 138 of the pivotally mounted slotted bar 134 translating the rotational movement of the knob 98 into lateral movement of the rack 140. The lateral movement of the rack 140 is at the same time translated into rotational movement of the focus cell 40 as the teeth of the rack 140 engage the complementary teeth of the spur gear 118.

By attaching the knob assembly 42 to the removable portion of the housing 46 one may first make an initial gross adjustment of the focus cell 40 with the rack assembly disengaged from the spur gear 118 to dive an approximate focusing position to the focus cell lens group 40 and then by reattaching the knob assembly 42 and engaging the rack 140 and spur gear 118 to give fine focusing control to the user.

A night viewer device 10 of the type having an objective lens assembly for gathering light forming the image of the scene to be viewed, an image enhancing unit 22 for enhancing the image into a desired format, and, the image to be enhanced received at an input end 26 of the image enhancing unit 22, can be focused using the steps of:

controllably moving a focus cell assembly 40 of the image enhancing unit 22 along a desired central optical axis 32 through the objective lens assembly 20 through rotational movement of a user accessible knob assembly 42 about an axis 44 essentially perpendicular to the central optical axis 32 is mechanically translated into rotational movement of the focus cell 40 to move the focus cell 40 fore and aft relative to the objective lens assembly 20 along the desired optical path 32 through the objective lens assembly 20.

The foregoing disclosure and description of the invention are illustrative and explanatory thereof, and various changes in the size, shape and materials, as well as in the details of the illustrated construction may be made without departing from the spirit of the invention.

The invention claimed is:

1. A night viewer device adaptable to generate an enhanced image of a scene suitable to be viewed through an optical scope, the invention comprising:

an input end of the night viewer device for receiving the image to be enhanced through an objective lens assembly;

an image enhancing unit for enhancing the image into a desired format; the image to be enhanced being transmitted to the ocular lens end of the optical scope after being received through an input end of the image enhancing unit;

an output image display unit operably connected with the image enhancing unit for displaying of the enhanced image; and, a Risley prism unit located in an image path through the night viewer device after a collimating lens assembly of the night viewer device receiving the image displayed by the output image display unit;

whereby the Risley prism unit may be controllably adjusted to provide optical alignment within the night viewer device to establish true boresight alignment.

2. The invention of claim 1 wherein the night viewer device is mountable on a man portable weapon.

3. The invention of claim 2 wherein the man portable weapon has a mounted optical scope and the night viewer device is mountable in an optical path ahead of the optical scope.

4. The invention of claim 1 wherein the image enhancing unit includes an image intensifier tube.

5. The invention of claim 4 wherein the output image display is a phosphorescent screen.

6. The invention of claim 1 wherein the night viewer device is releasably mountable in proximity to the optical sight.

7. The invention of claim 1 further including focusing means for moving a focus cell assembly of the image enhancing unit along a desired optical axis through an objective lens assembly of the night viewer device.

8. The invention of claim 1 wherein the night viewer device has unity power for preserving a normal sight picture for the optical scope.

9. The invention of claim 1 wherein the Risley prism unit is located after an optical grouping consisting of the objective lens assembly, the image enhancing unit with output image display unit, and the collimating lens assembly relative to an image path through the night viewer device.

10. A method for aligning an optical axis of a night viewer device for viewing through an optical scope including the steps of:

enhancing an image of a scene to be viewed with an image enhancing unit for enhancing the image into a desired format; the image to be enhanced being received by an input end of the image enhancing unit;

producing an output image with an output image display unit for selective viewing of the enhanced image; and, transmitting the enhanced image of the scene to be viewed through a Risley prism unit located in an image path through the night viewer device after a collimating lens assembly of the night viewer device receiving the image displayed by the output image display unit;

whereby the optical axis alignment of the night viewer device is adjusted through rotation of at least one prism in the Risley prism unit to provide optical alignment within the night viewer device to establish true boresight alignment.

11. The method of claim 10 wherein the image enhancing unit includes an image intensifier tube.

12. The method of claim 10 wherein the output image display is a phosphorescent screen.

13. The method of claim 10 wherein the enhanced image of the scene has unity power for preserving a normal sight picture for the optical scope.

14. The method of claim 10 wherein the Risley prism unit is located after an optical grouping consisting of the objective lens assembly, the image enhancing unit with output image display unit, and the collimating lens assembly relative to an image path through the night viewer device.

* * * * *